US009767852B2

(12) United States Patent
Vouin et al.

(10) Patent No.: US 9,767,852 B2
(45) Date of Patent: Sep. 19, 2017

(54) SYSTEMS AND METHODS FOR DETECTING AUDIO MISMATCHES BETWEEN DIGITAL MEDIA FILES

(71) Applicant: Frederick Mwangaguhunga, New York, NY (US)

(72) Inventors: Florent Vouin, Paris (FR); Nicolas Lapomarda, Paris (FR)

(73) Assignee: Frederick Mwangaguhunga, New York, NY (US)

( * ) Notice: Subject to any disclaimer, the term of this patent is extended or adjusted under 35 U.S.C. 154(b) by 0 days.

(21) Appl. No.: 14/851,143

(22) Filed: Sep. 11, 2015

(65) Prior Publication Data

US 2017/0076753 A1    Mar. 16, 2017

(51) Int. Cl.
| | | |
|---|---|---|
| *H04N 5/93* | (2006.01) | |
| *G11B 27/00* | (2006.01) | |
| *G11B 27/10* | (2006.01) | |
| *G11B 27/031* | (2006.01) | |
| *H04N 5/932* | (2006.01) | |
| *H04N 5/935* | (2006.01) | |

(52) U.S. Cl.
CPC ............ *G11B 27/10* (2013.01); *G11B 27/031* (2013.01)

(58) Field of Classification Search
CPC .......... H04N 5/93; H04N 5/932; H04N 5/935; H04N 5/931; G11B 27/00
USPC ........ 386/285, 278, 280, 282, 286, 201, 207
See application file for complete search history.

(56) References Cited

U.S. PATENT DOCUMENTS 9,368,151 B2 * 6/2016 Pello ................ G11B 20/10287

* cited by examiner

*Primary Examiner* — Daquan Zhao
(74) *Attorney, Agent, or Firm* — Norris McLaughlin & Marcus, P.A.

(57) ABSTRACT

Systems and methods determine, identify and/or detect one or more audio mismatches between at least two digital media files by providing a group of digital media files to a computer system as input files. Each digital media file comprises digital audio and digital video signals previously recorded at a same performance by a same artist, and the digital media files are previously synchronized with respect to each other and aligned on a timeline of the same performance and provide a first multi-angle digital video of the same performance. The systems and methods compare audio features based on the audio signals of each digital media file and detect at least one audio mismatch between at least two digital media files of the group based on compared audio features, wherein the at least one audio mismatch is generated by, caused by or based on one or more previously edited digital media files present within the group.

16 Claims, 16 Drawing Sheets

1. Construct the graph adjacency matrix $A$, where $$A_{i,j} = A_{j,i} = \begin{cases} 1 & \text{if } d_{i,j} = 0 \\ \infty & \text{otherwise} \end{cases} \qquad (4)$$

2. Initialise the set of unvisited nodes (files): $U = \{0 \ldots N_{files} - 1\}$
3. Initialise the number of groups $N_{groups} = 0$ and $\mathfrak{G} = []$, the list of "groups of file" found
4. While $|U| > 0$
   (a) Pick a file $i \in U$, put $i$ in a new group $G_{N_{groups}}$
   (b) Perform a Breadth First Search and associate all reachable nodes $j$ to the current group: $j \in G_{N_{groups}}$
   (c) Remove the current group from unvisited nodes: $U \leftarrow U \setminus G_{N_{groups}}$
   (d) Add the current group to the list of groups, and increment the groups counter: $\mathfrak{G}[N_{groups}] = G_{N_{groups}}, N_{groups} \leftarrow N_{groups} + 1$
5. Return $\mathfrak{G}$ This clustering is performed independently at each atom $a$. This grouping allows us to define a new similarity measure $s_{i,j}$, globally, between two files:

$$s_{i,j} = \begin{cases} -1 & \text{if } C_{i,j} = \emptyset \\ \frac{1}{|C_{i,j}|} \sum_{a \in C_{i,j}} \mathbb{1}\left(\exists g \mid \{i,j\} \subseteq G_g^a\right) & \text{otherwise} \end{cases} \qquad (5)$$

$$C_{i,j} = \{a \mid A_{i,a} = 1 \wedge A_{j,a} = 1\} \qquad (6)$$

FIG. 8

1. Set distances (costs) from $i$ (in terms of jumps from file to file) to $\infty$, except for $i$ itself:

$$c_k = \begin{cases} 0 & k = i \\ \infty & k \neq i \end{cases} \qquad (11)$$

2. Initialise the set of unvisited nodes: $U = \{0 \ldots N_{files} - 1\}$
3. While $|U| > 0$
   (a) Pick the closest unvisited node: $k = \arg\min_{k \in U} c_k$
   (b) If $c_k = \infty$ or $c_k > c_j$, there is no other reachable node left, or we are past the shortest distance to $j$. Leave the loop.
   (c) Remove $k$ from the set of unvisited nodes: $U \leftarrow U \setminus k$
   (d) For all node $l$ in the neighbourhood of $k$, i.e. $A_{k,l} < \infty$
      i. $c_l \leftarrow \min(c_l, c_k + A_{k,l})$
4. Initialise empty sets that contain the list of possible nodes at each distance between $i$ and $j$: $\mathcal{P}_c$, for $c = 1 \ldots c_j$ and $\mathcal{P}_{c_j} = j$
5. For $c = c_j - 1 \ldots 1$
   (a) $\mathcal{P}_c = \{l \mid (\exists k \in \mathcal{P}_{c+1} \mid A_{k,l} < \infty, c_l = c)\}$
6. Return the sets $\mathcal{P}_c$ for $c = 1 \ldots c_j - 1$ From the "possible nodes" $\mathcal{P}_c$, we want to find the point $c$ where we can only choose one file $k$, i.e. the "bottleneck":

1. Set the edited video indicator: $e_1[i] = 0$ for $i \in [0, N_{files} - 1]$
2. For each "globally mismatching" pair of files, i.e. $\{i, j\} \mid s_{i,j} < 0.1$:
   (a) Get $\mathcal{P}_c$ and $c_j$ using the previous algorithm for $\{i, j\}$
   (b) For $c = 1 \ldots c_j - 1$
      i. If $|\mathcal{P}_c| = 1$, i.e. we found a bottleneck in the path, $e_1[\mathcal{P}_c] \leftarrow e_1[\mathcal{P}_c] + 1$ From there, the most likely edited videos are the ones with a high indicator $e_1$.

FIG. 9

SYSTEMS AND METHODS FOR DETECTING AUDIO MISMATCHES BETWEEN DIGITAL MEDIA FILES

FIELD OF DISCLOSURE

The present systems and methods detect audio mismatches between at least two digital multimedia files (hereinafter "files"), wherein the files comprise both digital audio signals and/or tracks (hereinafter "audio signals") and digital video signals or tracks (hereinafter "video signals") of a previously recorded same audio/video performance and/or event (hereinafter "same performance"). Additionally, the present systems and methods execute, implement and utilize one or more computer-implemented methods, one or more computer instructions, one or more computer algorithms and/or computer software (hereinafter "computer instructions) to detect audio mismatches between a plurality of the files of a previously recorded same performance. In embodiments, the files may have previously been obtained from a database or uploaded to and/or obtained from an online website and/or server and the previously recorded same performance may be an entire concert, a portion of said concert, an entire song, a portion of said song and/or the like. The files have previously been synchronized and aligned on a timeline of the same performance by systems and computer-implemented methods for chronologically ordering digit media and approximating a timeline as disclosed in U.S. Ser. No. 14,697,924 (hereinafter "the '924 application"), which is incorporated herein by reference, in its entirety.

SUMMARY OF THE DISCLOSURE

Since the files have been previously synchronized and aligned on the timeline, the precise or exact location of the files on the timeline of the entire same performance is known. The timeline may refer to a time indication about a start of the performance, event, concert or song and/or an end of the performance, event, concert or song. However, a problem may arise when at least one of the previously synchronized and aligned files has previously been edited prior to the previous synchronization and alignment. As a result of this previous editing, the timeline previously created may not be correct or may contain one or more inaccuracies or errors. Moreover, depending on the files that were previously matched, synchronized and/or aligned, "collisions" between one or more songs may happen or occur. As a result, two groups of files corresponding to two different songs may overlap and/or may seriously alter the final output, a single multi-angle digital video file of the same performance comprising one or more of the synchronized and aligned files.

The present systems, methods and/or computer instructions account for, or take into consideration, the fact that the previously created timeline of the same performance may not be correct if one or more edited digital media files (hereinafter "edited files") are present in the previously synchronized and aligned files. Additionally, the present systems, methods and/or computer instructions act as a post-processing step to previous synchronization and alignment. If the timeline is, in fact, incorrect, then the present systems, methods and/or computer instructions look for and/or detect or identify potentially edited or edited files or files that may most likely to cause inaccuracies or errors in the final output. Further, any edited files detected or identified by the present systems, methods and/or computer instructions may be subsequently removed from the processing and/or the timeline. Moreover, after removal of the edited file(s), the present systems, methods and/or computer instructions may re-synchronize and/or re-align the remaining files to produce, create and/or generate a new single multi-angle digital video file of the same performance in accordance with the systems, methods and/or computer algorithms disclosed in the '924 application.

In embodiments, systems and/or computer-implemented methods detect audio mismatches between digital media files previously recorded at a same performance by a same artist and provide a group of digital media files to a computer system as input files, wherein each digital media file of the group comprises digital audio and digital video signals previously recorded at the same performance, wherein the digital media files of the group are previously recorded at the same performance by at least two different digital mobile devices, are previously synchronized with respect to each other and aligned on a timeline of the same performance, and provide a first multi-angle digital video of the same performance. Further, the systems and/or methods may compare audio features the group of digital media files to detect at least one audio mismatch between at least two digital media files of the group, wherein the audio features are based on the audio signals of each digital media file of the group, and detect at least one audio mismatch between at least two digital media files of the group based on compared audio features, wherein the at least one audio mismatch is generated by, caused by or based on one or more edited digital media files contained within the group, wherein the one or more edited digital media files were previously edited prior to the previous synchronization and alignment on the timeline of the same performance.

In an embodiment, the systems and/or methods may remove the one or more edited digital media files from the group and/or the timeline of the same performance.

In an embodiment, the systems and/or methods may synchronize and align the remaining digital media files of the group on the timeline of the same performance to produce a second multi-angle digital video of one or more portions of the same performance.

In an embodiment, the audio features may be time-frequency features of the digital media files of the group.

In an embodiment, the systems and/or methods may reduce the time-frequency features to binary vectors prior to comparing the audio features.

In an embodiment, the systems and/or methods may determine a global indicator for each pair of digital media files of the group based on the binary vectors prior to detecting the at least one audio mismatch.

In an embodiment, the systems and/or methods may assign a mismatch classification, a partial match classification or a match classification to each pair of digital media files of the group based on the determined global indicator for each pair of digital media files of the group prior to detecting the at least one audio mismatch.

In an embodiment, the systems and/or methods may identify the one or more edited digital media files based on the mismatch and/or partial match classifications.

In an embodiment, the systems and/or methods may remove a first digital media file from the group that has a greatest number of mismatch classifications assigned thereto.

In an embodiment, the systems and/or methods may remove a second digital media file from the group that has a greatest number of partial match classifications assigned thereto.

In an embodiment, the systems and/or methods may utilize at least one selected from a modified Dijkstra algorithm and a graph-based detection, based on a path between two digital media files of the group having been assigned mismatching classifications, to identify the one or more edited digital media files.

In an embodiment, the systems and/or methods may utilize an audio feature-based detection, based on processing digital media files of the group having been assigned partial match classifications, to identify the one or more edited digital media files.

In embodiments, systems and/or computer-implemented methods detect audio mismatches between digital media files previously recorded at a same performance by a same artist and provide a group of digital media files to a computer system as input files, wherein each digital media file of the group comprises digital audio and digital video signals previously recorded at the same performance, wherein the digital media files are previously recorded at the same performance by at least two different digital mobile devices, are previously synchronized with respect to each other and aligned on a timeline of the same performance, and provide a first multi-angle digital video of the same performance. Further, the systems and/or methods may split the timeline of the same event into time intervals, compare digital media files of the group at each time interval time independently by utilizing time-frequency features of each digital media file to determine distances associated with each pair of digital media files of the group, and determine a global indicator for each pair of digital media files of the group based on the determined distances associated with each pair of digital media files of the group. Moreover, the systems and/or methods may assign a mismatch classification, a partial match classification or a match classification to each pair of digital media files of the group based on the determined global indicator for each pair of digital media files of the group, and detect at least one audio mismatch between at least two digital media files of the group by identifying one or more edited digital media files contained within the group based on the mismatch and/or partial match classifications, wherein the one or more edited digital media files were previously edited prior to the previous synchronization and alignment on the timeline of the same performance.

In an embodiment, the systems and/or methods may remove the one or more edited digital media files from the group and/or the timeline of the same performance.

In an embodiment, the systems and/or methods may synchronize and align the remaining digital media files of the group on the timeline of the same performance to produce a second multi-angle digital video of one or more portions of the same performance.

In an embodiment, the systems and/or methods may reduce the time-frequency features to binary vectors prior to determining the distances associated with each pair of digital media files of the group.

In an embodiment, the distances may be obtainable by clipping Hamming distance of the binary vectors according the following equation:

$$d_{i,j} = \max\left(0, \min\left(1, \frac{\sum_k \mathbb{1}(v_i[k] \neq v_j[k]) - d_{match}}{d_{mismatch} - d_{match}}\right)\right)$$

In an embodiment, the systems and/or methods may remove a first digital media file from the group that has a greatest number of mismatch classifications assigned thereto.

In an embodiment, the systems and/or methods may remove a second digital media file from the group that has a greatest number of partial match classifications assigned thereto.

BRIEF DESCRIPTION OF THE DRAWINGS

So that the above recited features and advantages of the present systems and methods can be understood in detail, a more particular description of the present systems and methods, briefly summarized above, may be had by reference to the embodiments thereof that are illustrated in the appended drawings. It is to be noted, however, that the appended drawing illustrates only typical embodiments of this invention and are therefore not to be considered limiting of its scope, for the present systems and methods may admit to other equally effective embodiments.

FIG. 8 illustrates an algorithm for grouping or clustering atoms together by utilizing strong confidences in an embodiment.

FIG. 9 illustrates an algorithm for detecting an edited file based on at least one path between at least two files having been assigned mismatch classifications in an embodiment.

DETAILED DESCRIPTION OF THE DISCLOSURE

Figure 1:
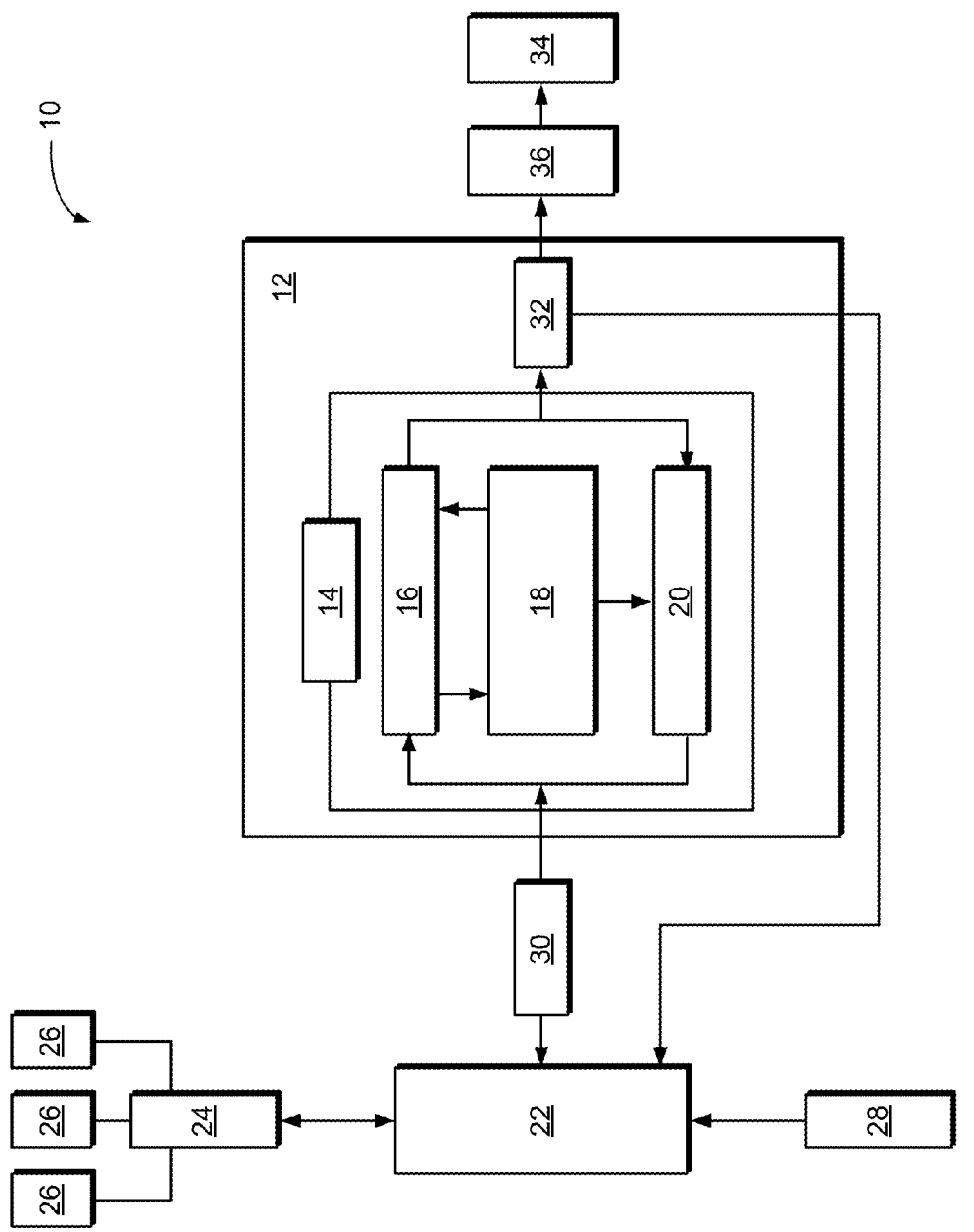
FIG. 1 illustrates a block diagram of a computer system for detecting audio mismatches between files in an embodiment.

Referring now to the drawings wherein like numerals refer to like parts, FIG. 1 shows a computer system 10 (hereinafter "system 10") configured and/or adapted for detecting one or more audio mismatches between two or more digital media files 26 (hereinafter "files 26").

The present systems 10 and/or methods comprise techniques and/or tools for detecting, identifying and/or determining audio mismatches between a group of files 26 (hereinafter "group"), each comprising both digital audio and video tracks or signals (hereinafter "signals"). The files 26 may be, or are, previously recorded digital media files recorded by at least two different digital mobile devices (hereinafter "devices 28") at a same performance previously performed by an artist, and the group of files 26 may comprise at least two previously recorded files 26 during the same performance. Further, the previously recorded files 26 were recorded during at least a portion of the same performance and were previously synchronized and aligned on a timeline of the same performance by the systems, methods and/or an auto-synchronization algorithm as disclosed in the '924 application. In embodiments, the files 26 may have previously been obtained from a database 24 or uploaded to and/or obtained from an online or offline server and/or website 22 (hereinafter "server/website 22"). In embodiments, the previously recorded same performance may be one or more: songs or portions of songs; albums or portion of albums, concerts or portions of concerts; speeches or portions of speeches; musicals or portions of musicals; operas or portion of operas; recitals or portions of recitals; performing arts of poetry and/or storytelling; works of music; artistic forms of expression; and/or other known audio/visual forms of entertainment. In an embodiment, the previously recorded same performance is a song or a portion of said song and/or a concert or a portion of said concert.

The system 10 comprises at least one computer 12 (hereinafter "computer 12") which comprises at least one central processing unit 14 (hereinafter "CPU 14") having at least one control unit 16 (hereinafter "CU 16"), at least one arithmetic logic unit 18 (hereinafter "ALU 18") and at least one memory unit (hereinafter "MU 20"). One or more communication links and/or connections, illustrated by the arrowed lines within the CPU 14, allow or facilitate communication between the CU 16, ALU 18 and MU 20 of the CPU 14. One or more computer-implemented steps or instructions, computer algorithms and/or computer software (hereinafter "computer instructions") for determining, identifying and/or detecting one or more audio mismatches between at least two files 26 may be uploaded and/or stored on a non-transitory storage medium (not shown in the drawings) associated with the MU 20 of the CPU 14. The one or more computer instructions may comprise, for example, audio mismatch detector algorithm (hereinafter "AMD" algorithm"), a graph-based detection algorithm (hereinafter "GBD algorithm"), a modified Dijkstra algorithm (hereinafter "MD algorithm") and/or a feature-based detection algorithm (hereinafter "FBD algorithm"). When executed by computer 12, the computer instructions may find, identify and/or detect one or more files 26 of the group that has been or was previously edited before or prior to the previous synchronization and alignment on the timeline of the same performance or event.

The system 10 may further comprise the server/website 22 and a database 24 which may be local or remote with respect to the computer 12 and/or the server/website 22. The computer 12 may be connected to and/or in digital communication with the server/website 22 and/or the database 24, as illustrated by the arrowed lines extending between the computer 12 and the server/website 22 and between the server/website 22 and the database 24. In an embodiment not shown in the drawings, the server/website 22 may be excluded from the system 10 and the computer 12 may be directly connected to and in direct digital communication with the database 24. A plurality of files 26 are stored within the database 24 which are accessible by and transferable to the computer 12 via the server/website 22 or via a direct communication link (not shown in the drawings) between the computer 12 and the database 24 when the server/website 22 is excluded from the system 10.

The files 26 stored in the database 24 may comprise digital media files that may have been previously recorded audio and video signals of one or more portions of the same performance that previously occurred. The one or more portions of the same performance may be one or more durations of time that occurred between the beginning and the end of the same performance. The digital audio and video signals of the files 26 are the original recorded audio and video signals recorded during the same performance by the at least two different users via the different devices 28 (i.e., from multiple sources at different points of view during the same performance). The files 26 of the group, that were previously recorded, synchronized and aligned on the timeline of the same performance, may provide a first multi-angle digital media video of the entire same performance or at one or more portions of the same performance.

In embodiments, original recorded audio and video signals from multiple sources may have been uploaded, transferred to or transmitted to the system 10 via the device 28 which may be connectible to the system 10 by a communication link or interface as illustrated by the arrowed line in FIG. 1 between server 22 and input device 28. In embodiments, the device 28 may be an augmented reality device, a computer, a digital audio/video recorder, a digital camera, a handheld computing device, a laptop computer, a mobile computer, a notebook computer, a smart device, a tablet computer, a cellular phone, a portable handheld digital video recording device, a wearable computer or a wearable digital device. The present disclosure should not be deemed as limited to a specific embodiment of the files 26 and/or the device 28.

In embodiments, the files 26 that are stored in the database 24 may comprise the group of previously recorded, synchronized and aligned files 26 which have been previously synchronized and aligned on the timeline such that their precise exact time location within the timeline of the entire same performance or a portion of the same performance is previously known, identified and determined. The CPU 14 may access the group of recorded, synchronized and aligned files 26 as input files 30 (hereinafter "input files 30" or "input 30") which may be stored in and/or accessible from the database 24. In an embodiment, the CPU 14 may select or request the input files 30 from the files 26 stored in the database 24. The CPU 14 may transmit a request for accessing the input files 30 to the server/website 22, and the server/website 22 may execute the request and transfer the input files 30 to the CPU 14 of the computer 12. The CPU 14 of the computer 12 may execute or initiate the computer instructions stored on the non-transitory storage medium of MU 20 to perform, execute and/or complete one or more computer-implemented algorithms, actions and/or steps associated with the present mismatch detecting systems and methods. Upon execution, activation, implementation and/or completion of the computer instructions, the CPU 14 may generate, produce, calculate or compute an output 32 which may be dependent of the specific inventive mismatch detecting method being performed by the CPU 14 or computer 12 and/or computer instructions.

For example, the present system 10 and/or present methods, upon execution of the computer instructions, may process, analyze and/or compare the input 30, comprising the group of previously synchronized and aligned files 26, to identify, determine and/or detect one or more audio mismatches between at least two files 26 of the group and/or one or more previously edited or potentially edited files of the group of files 26. The edited or potentially edited files of the group may, or more likely will, cause one or more errors or inaccuracies, such as, for example, the "collisions" between portions of the recorded same performance or in the multi-angle digital video of the same performance. The present system 10 may remove the edited or potentially edited files from the group of files 26 and/or from the input files 30 and subsequently re-synchronize and re-align the remaining files 26 in the group and/or in the input files 30 to produce, create and/or generate a new single output digital media file of the entire performance or at least a portion of the performance which may be a second multi-angle digital video of the same performance, excluding the edited or potentially edited files of the group. As a result, the single output digital media file or second multi-angle digital video may have a timeline or revised/new timeline that is correct and/or may be free from "collisions", errors and/or inaccuracies. In embodiments, the output 32 may comprise the one or more edited or potentially edited videos, the group of remaining videos 26 excluding the edited or potentially edited videos and/or the second multi-angle digital video.

In embodiments, the present system 10, methods and/or computer instructions may take into account or consider and/or may assume that the timeline of the same performance may not be correct if one or more edited or potentially edited files are contained within the group of files 26 that provide the first multi-angle digital video of the same performance. In an embodiment, the present system, methods and/or computer instructions utilize, execute and/or implement the AMD algorithm to take into account or consider that, or identify that, the timeline of the same performance will not be correct, or probably not correct, if one or more edited files are present within the group of files 26. As a result, the AMD algorithm may act as a post-processing step with respect to the previous synchronization and alignment of the files 26 on the timeline of the same performance. If the timeline appears to be, or is determined to be, incorrect, then the AMD algorithm may looks for, determine and/or identify one or more edited files within the group or one or more potentially edited files within the group. The one or more edited or potentially edited files are most likely to cause one or more errors in the first multi-angle digital video of the same performance. If one or more edited and/or potentially edited files are detected, determined and/or identified within the group, the present system 10, methods, computer instructions and/or AMD algorithm may remove the edited and/or potentially edited files from the group and/or from the timeline of the same performance. After removal, the system 10, methods, computer instructions and/or AMD algorithm may re-synchronize and/or re-align the remaining files 26 of the group onto the timeline of the same performance to produce, generate and/or create a second or revised timeline and/or a second or the revised/edited second multi-angle digital video of the same performance. As a result, the second multi-angle digital video of the same performance may be free of errors, inaccurate and/or edited and/or potentially edited digital media files.

In embodiments, the computer instructions and/or the AMD algorithm may be configured and/or adapted to conduct, execute and/or implement an atom-wise processing of the files 26 of the group. Additionally, the computer instructions and/or the AMD algorithm may be configured and/or adapted to split the timeline of the same performance into a plurality of time intervals or atoms (hereinafter "atoms") and subsequently compare each file 26 of the group independently at each time interval or atom (hereinafter "atom"). For example, the timeline may be split or divided into five second atoms, and the computer instructions and/or the AMD algorithm compare the files 26 of the group independently at the five second atoms. In embodiments, the atoms may be less the five second atoms, equal to five second atoms or greater than five second atoms. For more details on splitting the timelines of same performance into atoms and the arrangement of the atoms into or onto, for example, a matrix A, see U.S. Ser. No. 14,697,927 (hereinafter "the '927 application"), which is incorporated herein by reference, in its entirety. In embodiments, the atoms of the files 26 of the group may comparable using time-frequency features discussed hereinafter. In an embodiment, the time-frequency features are reduced to binary vectors prior to being compared by the computer instructions and/or the AMD algorithm. A distance is computed, determined and/or identified for each pair of atoms of each pair of files 26 of the group at a given time. The atoms may be subsequently grouped utilizing strong confidence links or small or smallest distances that were computed for the pairs of atoms.

After conducting, executing and/or implementing the above-mentioned atom-wise processing of the files 26 of the group, the computer instructions and/or the AMD algorithm may computer, determine and/or identify a global indicator for each pair of files 26 of the group. The computer instructions and/or AMD algorithm may assign one of the following classifications to each pair of files 26 of the group: a mismatch classification, a partial match classification, or a match classification. If one or more pairs of files 26 are assigned partial match and/or mismatch classifications, the partial match and/or mismatch classifications are an indicator that the timeline of the same performance may be incorrect and/or contain one or more errors therein. If one or more partial match and/or mismatch classifications have been assigned to one or more pairs of files 26 of the group, the present system 10, methods, computer instructions and/or ADM algorithm may utilize at least one computer-implemented method to find, determine and/or one or more edited files contained within the group of files 26. The one or more edited files are digital media files that were previously edited prior to the original or previous synchronization and/or alignment on the timeline of the same performance. As a result of the previous editing, the one or more edited files contained within the group may cause one or more errors or inaccurate within the timeline of and/or the first multi-angle digital video of the same performance. In embodiments, the computer-implemented method utilized to find, determine and/or identify the one or more edited files may comprise the GBD algorithm or the FBD algorithm.

In embodiments, the computer instructions and/or AMD algorithm may compare audio features of each file 26 of the group to assign the mismatch classification, the partial match classification or the match classification to each pair of the files 26 of the group. In embodiment, each time interval or atom of each file 26 may be described or provided as a single binary feature vector or a wavelet of a waveprint method (see Shumeet Baluja and Michele Covell. Waveprint: Efficient wavelet-based audio fingerprinting. *Pattern Recognition*, 41(11):3467-3480, November 2008). For example, each atom, for example, each five second atom of each file 26 may be described or provided as a single binary feature vector. However, wavelets may not be robust enough for the present methods and/or present algorithms; therefore, in embodiments, the binary feature vectors may be simplified as follows.

In embodiments, the present computer instructions and/or AMD algorithm may create a binary vector of an atom of each file 26 by computing, determining and/or identifying the audio signal's energy for $N_{bands}$, between $f_{band}[0]$=about 0 Hertz (hereinafter "Hz") and $f_{band}[N_{bands}-1]$=about 10 kiloHz (hereinafter "kHz"). In embodiments, $N_{bands}$ defines the number of frequency bands/notes/pitches that may be kept in the final binary feature vector and may be within a range from 20 to 200 log-spaced frequency bands. In an embodiment, the present computer instructions and/or AMD algorithm may create a binary vector of an atom of each file 26 by computing, determining and/or identifying the audio signal's energy for $N_{bands}$=48 log-spaced frequency bands, between $f_{band}[0]$=about 100 Hz and $f_{band}[N_{bands}-1]$=about 2 kHz. The $f_{band}[9]$, $f_{band}[N_{bands}-1]$ define the frequency band over which the features may be computed. In an embodiment, $f_{band}$ [b] may be the center frequency of filter b according to equation 1:

$$f_{band}[b+1]=\beta f_{band}[b] \qquad (1)$$

In embodiments, the spectrogram X [n, m] of the audio signal of each time interval or atom may be computed, determined and/or identified on a plurality of frames of a time length, wherein $L_{frame}$ may be between 256 and 65,536 frames and $L_{step}$ may be between 32 and 16,384 samples. In one embodiment, the spectrogram X [n, m] of the audio signal of each time interval or atom may be computed, determined and/or identified on a plurality of frames of a time length of about, for example, 372 milliseconds (hereinafter "ms"), ($L_{frame}$=16384 samples for $f_s$=44100 Hz), with a step of about 11.6 ms ($L_{step}$=about 512 samples) between each frame of the plurality of frames. In embodiments, obtaining the $N_{bands}$ filter frequency responses Y may be equivalent to multiplying the spectrogram by a ($L_{bands}/2+1$) matrix H:

$$Y^2=H^2X^2$$

All computations may be performed on squared magnitudes (i.e., $\cdot^2$ is the element-wise power operation).

In an embodiment, the filter-bank is composed of cosine filters (see Mathieu Ramona and Geoffroy Peeters. Audio-Print: An Efficient Audio Fingerprint System Based on a Novel Cost-less Synchronization Scheme. 2013), and a frequency response of band b is non-zero only for:

$$f \in [f_{band}[b-1], f_{band}[b+1]]$$

As a result, when summing up all cosine filters, one may be obtained, by the present computer instructions and/or AMD algorithm, for frequencies between frequency range, such as, for example, between 100 Hz and 2000 Hz according to equation (2):

$$\sum_{b=0}^{N_{bands}-1} H_{b,f}^2 = 1 \quad \forall f \in [100, 2000]\text{Hz} \qquad (2)$$

Figure 2:
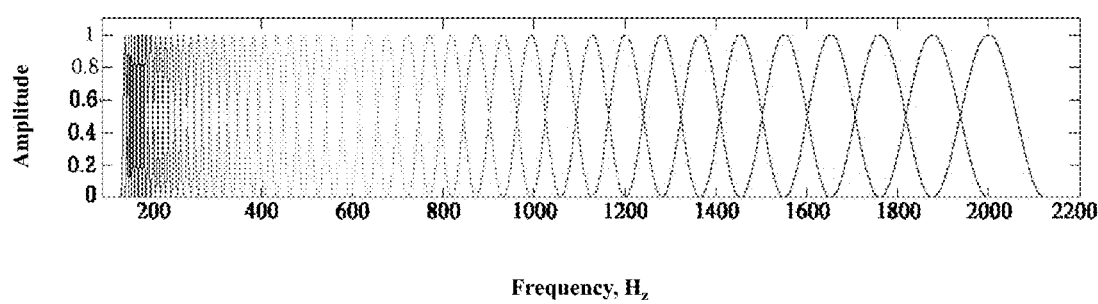
FIG. 2 illustrates a graph, in color, of a filter-bank of a digital media file that may form the basis for the audio features of the digital media file in an embodiment.

FIG. 2 shows a graph of a filter-bank that may form the basis for the present audio features of each file 26 of the group.

In an embodiment, an output of the filter-bank may provide, for example, 48 signals Y [b, m] sampled every 11.6 ms. As a result, the number of frequencies may be reduced and spaced logarithmically, which may facilitate the novel and inventive analyzing of the audio signals of each file 26 of the group achievable by present system 10, methods, computer instructions and/or AMD algorithm. To further achieve the novel and inventive analyzing of the audio signals, the present computer instructions and/or AMD algorithm may subsequently reduce the time dimension.

In embodiment, about 400 frames over time may be provide for the atom, such as, for example, the five second atom, which may be too large of a number of frames for a feature vector. The $N_{bands}$ signals which may be computed, determined and/or identified by the present computer instructions and/or AMD algorithm may vary greatly between two files 26 or pair of files 26, even when the two files 26 may, or do, match. Indeed, the frequency response of the audio sensors and/or recorders of the devices 28 utilized to previously record the files 26 may be slightly different or even dramatically different. To avoid relying on energy values and to speed up computation, determination and/or identification, an atom or each atom may be split in, for example, $N_{parts}$ which may define the number of time frames in the final binary feature vector (in one atom and may be between 4 time frames and 64 time frames. In an embodiment, $N_{parts}$ may be equal to 16 time frames along the time axis. The 48 time signals may be averaged, in energy, to produce 16 time values each. As a result, a size of the final feature vector may be: $N_{bands} \times N_{parts}$=768 and a final operation may be to obtain boolean values out of the average energies. For each frequency band (independently), the $N_{parts}/2$ higher values may be set to "true", and the other values may be set to "false". In embodiments, $N_{parts}/2$ defines the sparsity of the final binary feature vector and may be between 0.1 and 0.7.

Figure 3A:
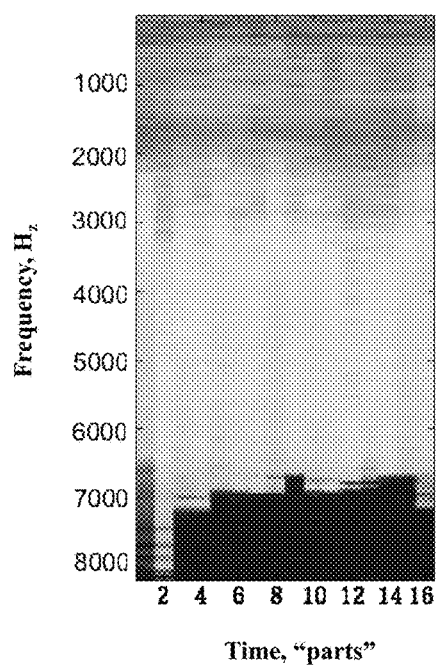
FIG. 3A illustrates a graph, in color, of a spectrogram averaged over time to obtain $N_{parts}=16$) values in an embodiment, whereby the x-axis represents time, in "parts" (one atom of 5 seconds divided in $N_{parts}=16$.
Figure 3B:
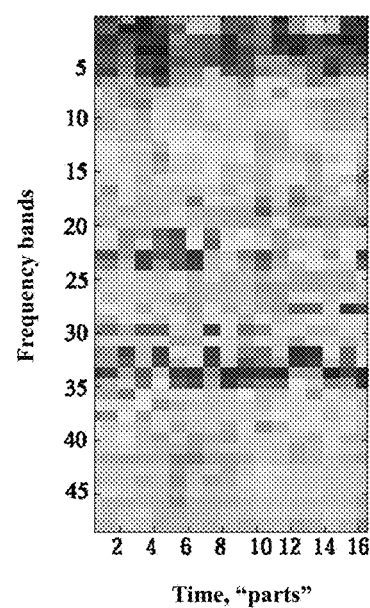
FIG. 3B illustrates a graph, in color, of an output of the filter-bank shown in FIG. 2 in an embodiment, whereby the x-axis represents time, in "parts" (one atom of 5 seconds divided in $N_{parts}=16$) and the y-axis represents frequency bands (between 1 and $N_{bands}$).
Figure 3C:
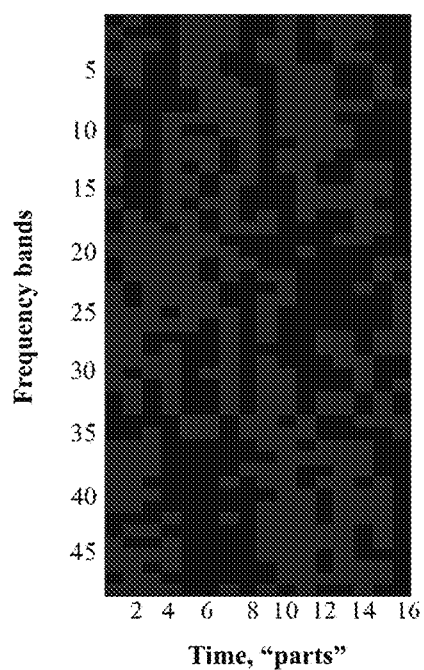
FIG. 3C illustrates a graph, in color, of a final binary vector v, reshaped as a matrix for clarity, in an embodiment, whereby the x-axis represents time, in "parts" (one atom of 5 seconds divided in $N_{parts}=16$) and the y-axis represents frequency bands (between 1 and $N_{bands}$).

FIGS. 3A-3C show computation, determination and/or identification of the binary feature: the spectrogram averaged over time to obtain $N_{parts}$=16 values as shown in FIG.

3A, the output of the bank filter as shown in FIG. 3B, and the final binary vector v, reshaped as a matrix for clarity, as shown in FIG. 3C.

Once the binary features have been computed, determined and/or identified for each atom of each file 26 of the group, the present computer instructions and/or AMD algorithm may compare binary features with binary vectors by utilizing the Hamming distance. Because of noise and/or that thresholding may be performed on each frequency band independently, the vectors, in embodiments, may not match perfectly even when the vectors should match perfectly. A final distance and/or similarity measure may be obtained, determined, identified and/or calculated by clipping the Hamming distance according to equation (3):

$$d_{i,j} = \max\left(0, \min\left(1, \frac{\sum_k \mathbb{1}(v_i[k] \neq v_j[k]) - d_{match}}{d_{mismatch} - d_{match}}\right)\right) \quad (3)$$

In an embodiment, $d_{i,j}=0$ may indicate that time intervals or atoms i and j match, as $d_{i,j}=1$ means that the atoms may not match at all. Additionally, $d_{match}$ and $d_{mismatch}$ may be expressed as a percentage of the feature vector size: $d_{match}=N_{bands} \times N_{parts} \times 36\%$ and $d_{mismatch}=N_{bands} \times N_{parts} \times 45\%$. In embodiments, $d_{match}$, $d_{mismatch}$ define the thresholds that determine whether two atoms are a match (similar) or not a match, $d_{match}$ may be between $0 \times N_{bands} \times N_{parts}$ and $0.7 \times N_{bands} \times N_{parts}$ and $d_{mismatch}$ may be between $0.3 \times N_{bands} \times N_{parts}$ and $1 \times N_{bands} \times N_{parts}$.

After having computed the audio features of each of the files 26 of the group, the present system 10, methods, computer instructions and/or AMD algorithm may cluster and/or group the atoms together based on and/or by utilizing strong confidences and/or small or smallest distances between the atoms. In embodiments, the computer instructions and/or AMD algorithm may compute, determine and/or identify distances $d_{i,j}$ for each pair of files 26 of the group, at each atom in time, such as, for example, each five second atom in time. The atoms may then be clustered, using only matches with high confidence or smallest distances ($d_{i,j}=0$). In an embodiment, the atoms may be five second atoms or excerpts. The cluster method executed, performed and/or implemented by the present computer instructions and/or AMD algorithm may only, or may subsequently only, utilize and/or keep high confidence links, one link between two excerpts may be enough to group or cluster those two excerpts in the same cluster. In an embodiment, the grouping and/or clustering process may similar to finding connected components in a graph, and may require initially searching depth or breadth according to the steps or equations (4)-(6) and/or algorithm set forth in FIG. 8.

In embodiments, $C_{i,j}$ may be a set of "common" atoms to i and j (the period of time they overlap). In an embodiment, $s_{i,j}$ may be a ratio of time when i and j are grouped or clustered in the same group or cluster, respectively, to the length of time when i and j overlap. When $s_{i,j}=1$, the match may be perfect, or substantially perfect, and the timeline of the same performance may be correct, at least for said pair of files 26. When $s_{i,j}=0$, the two files 26 should not overlap and there may definitely be something wrong in the timeline of the same performance. When $s_{i,j}=-1$, the two files 26 may not overlap, and there may be no way of knowing if this no overlapping is correct or not. Intermediate values of $s_{i,j}$ may be either due to bad audio quality or signal(s) or to edited files, which may only partially match other non-edited files.

In embodiments, one method or process suggesting, determining and/or identifying one or more files 26 from the group for removal may be to look at, analyze and/or utilize the values $s_{i,j}$. For example, the two files 26 of the group may be considered a match when $s_{i,j} \geq 0.7$, for $s_{i,j} \in [0.1, 0.7]$, the two files 26 of the group may be detected or considered as a partial match, and for $s_{i,j} < 0.1$, the two files 26 of the group may not match or may not be considered a match. In embodiments, the values 0.7, 0.1 may define thresholds determining when two file match, partially match, or do not match at all and other values may be utilized, such as, for example, [0.1, 0.8].

As a result, three indicators corresponding to the number of pairs of files 26 where each file 26 is classified as or assigned a mismatching classification, a partially matching classification or matching classification may be obtained, computed, determined and/or calculated according to equations (7)-(9) as follows:

$$n_{matches}[i] = \sum_j \mathbb{1}(s_{i,j} \geq 0.7) \quad \forall\, j \neq i \quad (7)$$

$$n_{partial}[i] = \sum_j \mathbb{1}(s_{i,j} \in [0.1, 0.7)) \quad \forall\, j \neq i \quad (8)$$

$$n_{mismatches}[i] = \sum_j \mathbb{1}(s_{i,j} \in [0, 0.1)) \quad \forall\, j \neq i \quad (9)$$

After classifications have been assigned and/or determined for each file 26 of the group, at least two decisions may be taken or made as follows. For a first decision, the file 26 with the highest number of mismatches or assigned the highest number of mismatching classification may be removed from the group of files 26 and/or from the timeline of the same performance which may ensure that the new, revised and/or updated timeline of the same performance may have, or may contain, fewer mismatches. However, if a previously edited file is contained within the group of files 26 and/or within the timeline, the first decision does not solve the problem associated with the one or more edited files. A second decision may be to remove the file 26 of the group having, or with, the highest number of partial matches or assigned the highest number of partial classifications which may suppress or remove the edited file from the group or the timeline. As a result, the timeline may be correct after correctly reordering all other sources or the remaining files 26 of the group.

Figure 4A:
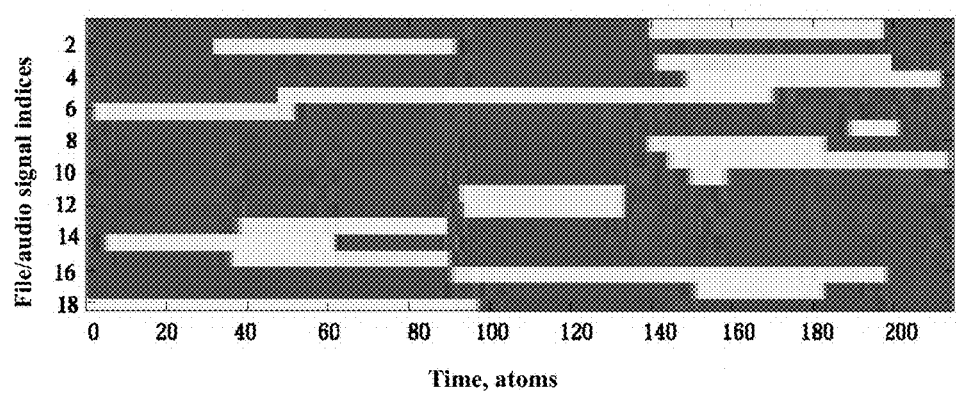
FIG. 4A illustrates a graph, in color, of a timeline of a group of files, as an input to the present systems, methods and/or computer instructions, in an embodiment, whereby the x-axis represents time, in atoms (of 5 seconds each) and the y-axis represents file/audio signal indices.
Figure 4B:
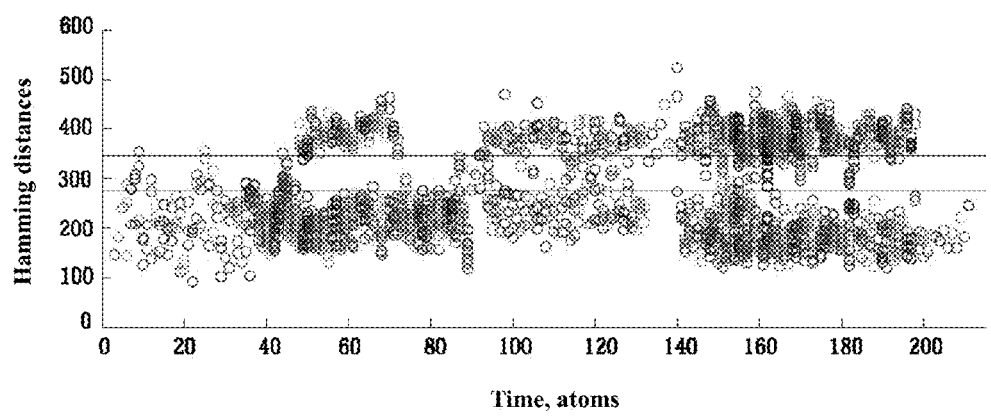
FIG. 4B illustrates a graph, in color, of hamming distances between audio features at each atom in time for the input shown in FIG. 4A in an embodiment, whereby the x-axis represents time, in atoms (of 5 seconds each) and the y-axis represents hamming distances (number of differences between binary vectors).
Figure 4C:
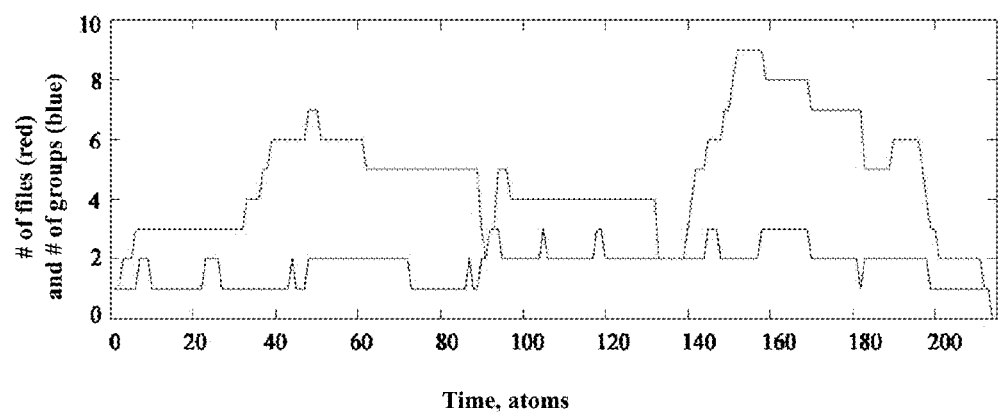
FIG. 4C illustrates a graph, in color, of the number of files over time (see red or uppermost line) and the number of groups found by finding connected components (see blue or lowermost line) for the input shown in FIG. 4A in an embodiment, whereby the x-axis represents time, in atoms (of 5 seconds each) and the y-axis represents the number of files over time (see red line) and the number of groups found by finding connected components (see blue line).

FIG. 4A shows a timeline of the group of files 26 as input files 30;

FIG. 4B shows the hamming distances between audio features at each atom in time wherein the two horizontal lines represent $d_{match}$ and $d_{mismatch}$ for the group shown in FIG. 4A, whereby $d_{match}$ is lower horizontal line and $d_{mismatch}$ is the upper horizontal line; and FIG. 4C shows the number of files over time (see red or topmost line) and the number of groups found by finding connected components (see blue or bottommost line).

The hamming distances between audio features at each atom in time is determined according to:

$$\Sigma_k \mathbb{1}(v_i[k] \neq v_j[k])$$

Figure 5A:
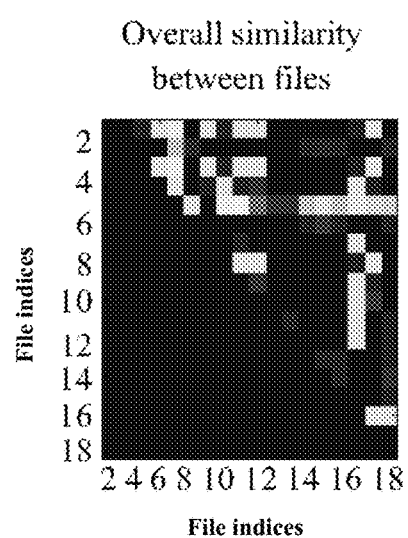
FIG. 5A illustrates a graph, in color, of global or overall similarities between files in an embodiment, whereby the x-axis and the y-axis represent file indices.
Figure 5B:
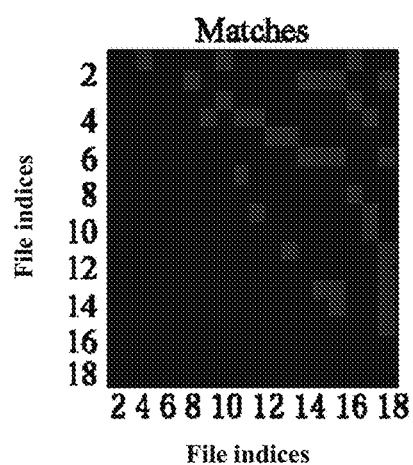
FIG. 5B illustrates a graph, in color, of matches between the files shown in FIG. 5A in an embodiment, whereby the x-axis and the y-axis represent file indices.
Figure 5C:
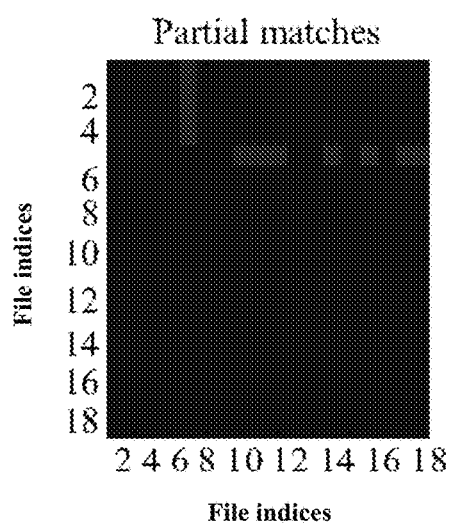
FIG. 5C illustrates a graph, in color, of partial matches between the files shown in FIG. 5A in an embodiment, whereby the x-axis and the y-axis represent file indices.
Figure 5D:
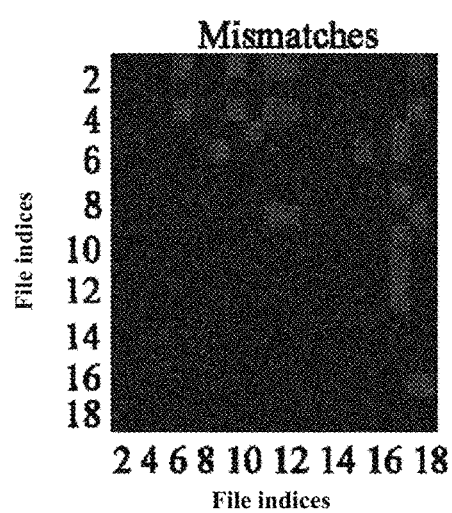
FIG. 5D illustrates a graph, in color, of mismatches between the files shown in FIG. 5A in an embodiment, whereby the x-axis and the y-axis represent file indices.

FIG. 5A shows global or overall similarities $s_{i,j}$ between the files 26 of the group;

FIG. 5B shows thresholded values of $s_{i,j}$ to estimate matching of the files 26 of the group;

FIG. 5C shows thresholded values of $s_{i,j}$ to estimate partial matching of the files 26 of the group; and FIG. 5D shows thresholded values of $s_{i,j}$ to estimate mismatching of the files 26 of the group.

In embodiments, the present system 10, methods, computer instructions and/or AMD algorithm may execute, perform and/or implement a first computer-implemented detection (hereinafter "first detection") method to find, determine and/or identify the one or more edited files based on at least two mismatch classifications assigned to at least two files of the group. The first detection method may be, for example, a graph-based detection method that may utilize and/or analyze one or more paths between at least two files of the group that have been assigned mismatch classifications. As a result, the first detection method may find, identify and/or determine the one or more edited files based on the one or more paths between the at least two files of the group that have been assigned mismatch classifications.

In an embodiment, if two files i and j do not, at all or substantially at all, match, files i and j may not, themselves, be edited files. Instead, files i and j may overlap because files i and j may have been incorrectly ordered on the timeline of the same performance, which may, for example, depend on one or more delays that files i and j may have had with an edited file within the group that is common to files i and j (hereinafter "common edited file"). As a result, the first detection method may be configured and/or adapted to find, determine and/or identify the common edited file within the group. In embodiments, the first detection method may find, determine and/or identify a first path, on the timeline by jumping from file to file within the group from file i to file j. Along the first path, the first detection method may find, determine and/or identify the common edited file, because the common edited file may be the only file that may "coherently" synchronizes the two mismatching files (i.e., files i and j). To go, move and/or jump from file i to file j, the first detection method may utilize one or more or any file 26 of the group that has at least a partial match classification, whereby the first path may go through and/or include the common edited video. As a result, the first detection method may construct and/or generate a graph with the adjacency matrix A:

$$A_{i,j} = A_{j,i} = \begin{cases} 1 & \text{if } s_{i,j} \geq 0.1 \\ \infty & \text{otherwise} \end{cases} \quad (10)$$

In an embodiment, the first detection method may look for, determine and/or identify paths with the shortest distance; however, several paths may have the shortest distance because the paths often go through and/or include many files 26 of the same performance. The first detection method may be more or more interested in a "bottleneck" of the path (i.e., the file 26 of the group that all, or almost all, paths may need to take or include to reach file j from file i. For determining and/or identifying the "bottleneck" of the path, the first detection method may utilize, for example, a modified Dijkstra algorithm as set forth in FIG. 8. As a result, the first detection method may, by utilizing the modified Dijkstra algorithm, find, determine and/or identify the common edited file by determining and/or identifying the "bottleneck" of the path.

In embodiments, the present system 10, methods, computer instructions and/or AMD algorithm may look at and/or analyze files 26 that have been assigned partial matches in a global similarity matrix to find, determine and/or detect the one or more edited files contained within the group. Further, the system 10, methods, computer instructions and/or AMD algorithm may utilize a second audio feature-based detection (hereinafter "second detection") method which be configured and/or adapted to determine, identify and/or detect the edited files based on processing files 26 having been assigned partial match classifications.

Figure 6:
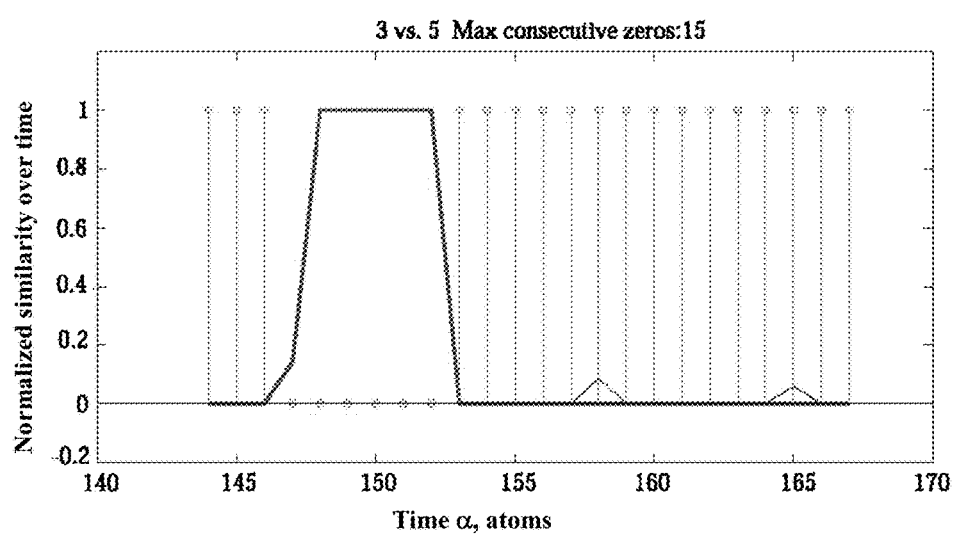
FIG. 6 illustrates a graph, in color, of similarity between two files over time in an embodiment, whereby the x-axis represents time, in atoms (of 5 seconds each) and the y-axis represents normalized similarity over time $s_{i,j}$ [a], where i and j are two file indices for which a partial match was detected.
Figure 7:
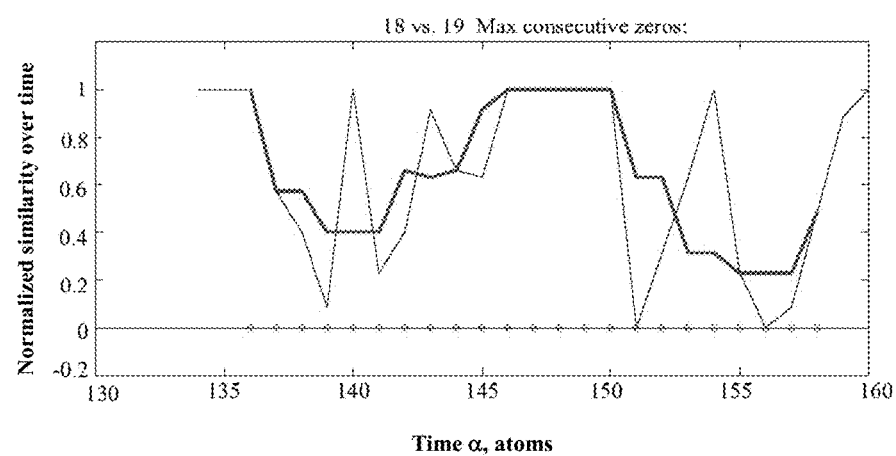
FIG. 7 illustrates a graph, in color, of similarity between two files that match, wherein one file is heavily distorted, in an embodiment, whereby the x-axis represents time, in atoms (of 5 seconds each) and the y-axis represents normalized similarity over time $s_{i,j}$ [a], where i and j are two file indices for which a partial match was detected.

In an embodiment, the second detection method may directly, substantially directly, look at and/or analyze the files 26 that were assigned partial match classifications in the global similarity matrix: $\{i, j\} | s_{i,j} \in [0.1, 0.7]$. Additionally, the similarity matrix having or comprising an intermediate value may be a good or helpful indicator that one of the files 26, within the matrix and having the partial match classification, may have been previously edited prior to the previous synchronization and alignment on the timeline. However, the intermediate value may also mean that one of the two files i or j may have, or be of, a bad or poor audio quality. To differentiate between these two possibilities (i.e., previously edited file and bad or poor audio quality, the second detection method may look at, analyze, determine and/or identify the similarity over time (i.e., atoms) $s_{i,j}[a]$, where a are the atoms for which files i and j overlap: $a \in C_{i,j}$. In an embodiment, the partial match classifications are caused by bad quality audio, $s_{i,j}[a]$ may vary greatly over time, wherein sometimes matching and/or taking low values. However, if the global partial match may be caused by an edited file, there may be a clear limit between the part where the two files i and j match, and where the edited file has been edited as shown in FIGS. 6 and 7. For example, FIG. 6 shows similarity between files i and j over time, whereby one file has been edited, wherein $s_{i,j}$ is shown as the blue line, a median filtered similarity is shown as a red line and consecutive zeros are shown as green lines. In another example, FIG. 7 shows similarity between files i and j that match; however, one file is heavily distorted as shown by the blue line.

For both FIGS. 6 and 7, a is the time in atoms, whereby at each point in time a, the similarity $s_{i,j}[a]$ is 1−d, where d is the distance defined in the above-identified equation (3). The distance d is computed between the two feature vectors of files i and j, corresponding to time a on the timeline. This similarity may be computed for all times a of which the two files i and j overlap, i.e., $a \in C_{i,j}$. The blue lines in FIGS. 6 and 7 represent the "raw similarity $s_{i,j}[a]$, the red lines represent the median filtered similarity, and the green lines represent the times a for which $s_{i,j}[a]=0$.

In embodiments, the second detection method may median filter $s_{i,j}[a]$ over a number of atoms to make the test on similarity more robust. For example, the number of atoms may be less than five atoms, equal to five atoms or greater than five atoms. Additionally, the second detection method may count the number of consecutive 0 that correspond to non-matching atoms. For example, if the filtered similarity may be strictly equal to, for example, 0 for 25 seconds (or five×five second atoms), one of the two file i and j must or may have been edited prior to the previous synchronization and aligning on the timeline. Said value of seconds/atoms defines the minimum mismatch length for an edited video to be detected, whereby the second value may be in the range of 10 to 60 seconds and the atoms value may be in the range of 2 to 12 atoms. Because the second detection method cannot or may not know which file i or j were edited, the indicator $e_2$ is incremented for both file i and j.

In an embodiment, the indicator $e_2$ may be decremented by one for all files. For example, if there is a single edited file i, each file j overlapping with file i may get $e_2[j]=1$, while $e_2[i]$ may be equal to number of partial matches file i may have with other files 26 of the group. Thus, removing one to all counters may reduce the number of false alarms, while not affecting, or substantially affecting, the indicator for real edited videos. As a result, the second detection method may find, determine and identify file i as the edited file. Moreover, the present system 10, methods, computer instructions, AMD algorithm and/or second detection method, may review file i from the group of files 26 and/or from the timeline of the same performance. Furthermore, the remaining files 26 of the group may be re-synchronized and/or re-aligned on the timeline to produce, create and/or generate the second multi-angle digital video of the same performance or at least a portion of the same performance as the output 32.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

The invention claimed is:

1. A computer-implemented method for detecting audio mismatches between digital media files previously recorded at a same performance by a same artist, the method comprising:
providing a group of digital media files to a computer system as input files, wherein each digital media file of the group comprises digital audio and digital video signals previously recorded at the same performance, wherein the digital media files of the group are previously recorded at the same performance by at least two different digital mobile devices, are previously synchronized with respect to each other and aligned on a timeline of the same performance, and provide a first multi-angle digital video of the same performance;
comparing audio features of the group of digital media files to detect at least one audio mismatch between at least two digital media files of the group, wherein the audio features are time-frequency features of the digital media files of the group;
detecting at least one audio mismatch between at least two digital media files of the group based on compared audio features, wherein the at least one audio mismatch is generated by, caused by or based on one or more edited digital media files contained within the group, wherein the one or more edited digital media files were previously edited prior to the previous synchronization and alignment on the timeline of the same performance;
reducing the time-frequency features to binary vectors prior to comparing the audio features; and
determining a global indicator for each pair of digital media files of the group based on the binary vectors prior to detecting the at least one audio mismatch.

2. The method according to claim 1, further comprising:
removing the one or more edited digital media files from the group and/or the timeline of the same performance.

3. The method according to claim 2, further comprising:
synchronizing and aligning the remaining digital media files of the group on the timeline of the same performance to produce a second multi-angle digital video of one or more portions of the same performance.

4. The method according to claim 1, further comprising:
assigning a mismatch classification, a partial match classification or a match classification to each pair of digital media files of the group based on the determined global indicator for each pair of digital media files of the group prior to detecting the at least one audio mismatch.

5. The method according to claim 4, further comprising:
identifying the one or more edited digital media files based on the mismatch and/or partial match classifications.

6. The method according to claim 4, further comprising:
removing a first digital media file from the group that has a greatest number of mismatch classifications assigned thereto.

7. The method according to claim 6, further comprising:
removing a second digital media file from the group that has a greatest number of partial match classifications assigned thereto.

8. The method according to claim 4, further comprising:
utilizing at least one selected from a modified Dijkstra algorithm and a graph-based detection, based on a path between two digital media files of the group having been assigned mismatching classifications, to identify the one or more edited digital media files.

9. The method according to claim 4, further comprising:
utilizing an audio feature-based detection, based on processing digital media files of the group having been assigned partial match classifications, to identify the one or more edited digital media files.

10. A computer-implemented method for detecting audio mismatches between digital media files previously recorded at a same performance by a same artist, the method comprising:
providing a group of digital media files to a computer system as input files, wherein each digital media file of the group comprises digital audio and digital video signals previously recorded at the same performance, wherein the digital media files are previously recorded at the same performance by at least two different digital mobile devices, are previously synchronized with respect to each other and aligned on a timeline of the same performance, and provide a first multi-angle digital video of the same performance;
splitting the timeline of the same event into time intervals;
comparing digital media files of the group at each time interval time independently by utilizing time-frequency features of each digital media file to determine distances associated with each pair of digital media files of the group;
determining a global indicator for each pair of digital media files of the group based on the determined distances associated with each pair of digital media files of the group;
assigning a mismatch classification, a partial match classification or a match classification to each pair of digital media files of the group based on the determined global indicator for each pair of digital media files of the group; and
detecting at least one audio mismatch between at least two digital media files of the group by identifying one or more edited digital media files contained within the group based on the mismatch and/or partial match classifications, wherein the one or more edited digital media files were previously edited prior to the previous synchronization and alignment on the timeline of the same performance.

11. The method according to claim 10, further comprising:
removing the one or more edited digital media files from the group and/or the timeline of the same performance.

12. The method according to claim 11, further comprising:
  synchronizing and aligning the remaining digital media files of the group on the timeline of the same performance to produce a second multi-angle digital video of one or more portions of the same performance.

13. The method according to claim 10, further comprising:
  reducing the time-frequency features to binary vectors prior to determining the distances associated with each pair of digital media files of the group.

14. The method according to claim 13, wherein the distances are obtainable by clipping Hamming distance of the binary vectors according the following equation:

$$d_{i,j} = \max\left(0, \min\left(1, \frac{\sum_k \mathbb{1}(v_i[k] \neq v_j[k]) - d_{match}}{d_{mismatch} - d_{match}}\right)\right).$$

15. The method according to claim 10, further comprising:
  removing a first digital media file from the group that has a greatest number of mismatch classifications assigned thereto.

16. The method according to claim 15, further comprising:
  removing a second digital media file from the group that has a greatest number of partial match classifications assigned thereto.

* * * * *